US009654164B2

(12) United States Patent
Irci et al.

(10) Patent No.: US 9,654,164 B2
(45) Date of Patent: May 16, 2017

(54) REMOVABLE ELECTRONIC DEVICE CASE WITH SUPPLEMENTAL WIRELESS CIRCUITRY

(71) Applicant: Apple Inc., Cupertino, CA (US)

(72) Inventors: Erdinc Irci, Santa Clara, CA (US); Enrique Ayala Vazquez, Watsonville, CA (US); Hongfei Hu, Santa Clara, CA (US); Mattia Pascolini, San Francisco, CA (US); Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/685,904

(22) Filed: Apr. 14, 2015

(65) Prior Publication Data

US 2016/0309007 A1    Oct. 20, 2016

(51) Int. Cl.
*H04M 1/00* (2006.01)
*H04B 1/3888* (2015.01)
(Continued)

(52) U.S. Cl.
CPC .......... *H04B 1/3888* (2013.01); *H01Q 1/243* (2013.01); *H04M 1/0262* (2013.01); *H04M 1/04* (2013.01)

(58) Field of Classification Search
CPC .... H04B 1/3833; H01Q 5/378; H01Q 9/0407; H01Q 9/0442; H01Q 1/243; H01Q 9/14
(Continued)

(56) References Cited

U.S. PATENT DOCUMENTS 6,341,217 B1   1/2002 Wong
6,456,247 B1   9/2002 Hulick et al.
(Continued)

FOREIGN PATENT DOCUMENTS

EP   2528165   11/2012
WO   9801919   1/1998
(Continued)

OTHER PUBLICATIONS

"Our Technology—Antenna79", Antenna79, [Retrieved on Jan. 29, 2015], Retrieved from the Internet:<URL:http://antenna79.wpengine.com/ourtechnology/>.
(Continued)

*Primary Examiner* — Simon Nguyen
(74) *Attorney, Agent, or Firm* — Treyz Law Group, P.C.; G. Victor Treyz; Michael H. Lyons

(57) ABSTRACT

A removable case may receive an electronic device. A male connector in the case may mate with a female connector in the device. A battery in the case may supply power to the device through the male connector. The electronic device may have an antenna formed from peripheral conductive housing structures and an antenna ground. The antenna may include a slot antenna resonating element. The case may have supplemental antenna structures such as a metal patch that overlaps an end of the slot antenna resonating element to retune the slot antenna resonating element to a desired operating frequency after being detuned by dielectric loading from the case. The supplemental antenna structures may overlap antennas of other types and may include tunable circuitry that is adjusted based on information received from the electronic device.

21 Claims, 7 Drawing Sheets

(51) Int. Cl.
*H01Q 1/24* (2006.01)
*H04M 1/02* (2006.01)
*H04M 1/04* (2006.01)

(58) Field of Classification Search
USPC ............ 455/90.3, 575.1, 575.5, 575.7, 575.8
See application file for complete search history.

(56) References Cited

U.S. PATENT DOCUMENTS

| | | | |
|---|---|---|---|
| 6,615,026 B1 | 9/2003 | Wong | |
| 7,391,380 B2 | 6/2008 | Nevermann | |
| 7,750,855 B2 | 7/2010 | Wong | |
| 8,155,607 B2* | 4/2012 | Kim | H01Q 1/243 343/702 |
| 8,207,906 B2 | 6/2012 | Tiscareno et al. | |
| 8,208,980 B2* | 6/2012 | Wong | H01Q 1/243 343/702 |
| 8,214,003 B2* | 7/2012 | Wong | H01Q 1/243 455/575.1 |
| 8,219,003 B2 | 7/2012 | Kudo et al. | |
| 8,750,948 B2 | 6/2014 | Wong et al. | |
| 9,007,758 B2* | 4/2015 | Wilson | H04M 1/026 248/918 |
| 9,124,679 B2* | 9/2015 | Ash, Jr. | H01Q 1/243 |
| 2003/0153281 A1* | 8/2003 | Abbasi | H04M 1/0202 455/90.1 |
| 2008/0165066 A1 | 7/2008 | Tiscareno et al. | |
| 2009/0069050 A1* | 3/2009 | Jain | G06K 19/07739 455/558 |
| 2009/0264148 A1 | 10/2009 | Tom | |
| 2010/0013720 A1* | 1/2010 | Sakata | H01Q 9/42 343/702 |
| 2010/0026589 A1* | 2/2010 | Dou | H01Q 21/28 343/702 |
| 2011/0248895 A1* | 10/2011 | Bungo | H01Q 1/243 343/702 |
| 2012/0169439 A1* | 7/2012 | Ikehata | H01Q 1/242 333/24 C |
| 2012/0188141 A1* | 7/2012 | Islam | H01Q 1/243 343/860 |
| 2012/0206303 A1* | 8/2012 | Desclos | H01Q 1/243 343/702 |
| 2012/0258741 A1* | 10/2012 | Tillson | G01S 3/046 455/457 |
| 2012/0268328 A1* | 10/2012 | Kim | H01Q 1/243 343/702 |
| 2012/0295666 A1* | 11/2012 | Sakurai | H01Q 1/243 455/566 |
| 2013/0059528 A1 | 3/2013 | Hirai | |
| 2013/0069583 A1 | 3/2013 | Lemelman et al. | |
| 2013/0194136 A1* | 8/2013 | Handro | H01Q 1/243 343/702 |
| 2013/0194143 A1* | 8/2013 | Bungo | H01Q 21/28 343/725 |
| 2014/0062816 A1* | 3/2014 | Jo | H01Q 9/04 343/745 |
| 2014/0065948 A1* | 3/2014 | Huang | H05K 5/0086 455/7 |
| 2014/0165379 A1 | 6/2014 | Diebel et al. | |
| 2014/0333554 A1 | 11/2014 | Kim et al. | |
| 2015/0011273 A1* | 1/2015 | Wilmhoff | H01Q 1/245 455/575.7 |
| 2015/0055292 A1 | 2/2015 | Lee et al. | |
| 2015/0103018 A1 | 4/2015 | Kamin-Lyndgaard et al. | |
| 2015/0222008 A1* | 8/2015 | Cooper | H01Q 1/243 343/702 |
| 2015/0295446 A1* | 10/2015 | Fathollahi | H02J 7/0045 455/573 |
| 2016/0072539 A1 | 3/2016 | Hu et al. | |
| 2016/0149290 A1* | 5/2016 | Park | H01Q 1/243 343/702 |
| 2016/0191101 A1* | 6/2016 | Rayner | H04B 1/3888 455/575.8 |

FOREIGN PATENT DOCUMENTS

| | | |
|---|---|---|
| WO | 2004095634 | 11/2004 |
| WO | 2014011943 | 1/2014 |

OTHER PUBLICATIONS

"iPhone 6 Cases with Advanced Technology from Reach79" Reach79, 2015, [Retrieved on Jan. 29, 2015], Retrieved from the Internet:<URL:http://www.reach79.com/>.

"Home", Antenna79, 2015, [Retrieved on Jan. 29, 2015], Retrieved from the Internet:<URL:http://antenna79/our-technology>.

"Pong Radiation Protection Cases for iPhone, iPad and Samsung Galaxy", Pong, 2014, [ Retrieved on Jan. 29, 2015], Retrieved from the Internet: <URL:http://pongcase.com/>.

Mossberg, "Review: An iPhone Case That Claims to Boost Your Reception", Re/code, Jan. 13, 2015, [Retreived on Feb. 1, 2015] , Retrieved from the Internet: <URL:http://recode.net/2015/01/13/review-an-iphone-case-that-claims-to-boost-your-reception/?share=reddit&nb=1>.

uNu Unity Battery Case for Samsung galaxy S4 SIV. uNu, 2012 [retrieved on Oct. 3, 2014]. Retrieved from the Internet: <http://www.myunu.com/unu-dx-protective-battery-case-for-samsung-galaxy-siv.html>.

* cited by examiner

REMOVABLE ELECTRONIC DEVICE CASE WITH SUPPLEMENTAL WIRELESS CIRCUITRY

BACKGROUND

This relates generally to removable cases for electronic devices and, more particularly, to removable cases for wireless electronic devices.

Electronic devices often include wireless circuitry. For example, cellular telephones, computers, and other devices often contain antennas for supporting wireless communications with external equipment.

Removable cases are sometimes used with electronic devices. Some cases are passive plastic sleeves that help protect the outer surface of an electronic device from scratches. Other cases contain supplemental batteries. When a case with a supplemental battery is attached to an electronic device, a user can perform more functions without running out of battery power.

It can be challenging to ensure that an electronic device antenna operates properly in the presence of an external case. The materials of the case may affect antenna operation. For example, metal structures associated with a battery or other components may interfere with the normal operation of an electronic device antenna and dielectric materials may load an antenna. If care is not taken, wireless performance for an electronic device may be degraded in the presence of a removable case.

It would therefore be desirable to be able to provide improved removable cases for electronic devices such as electronic devices with antennas.

SUMMARY

An electronic device may be provided with a removable case. The removable case may include a connector that mates with a connector port in the electronic device. The removable case may include a battery to provide the electronic device with supplemental power.

The removable case may have a body that is configured to receive the electronic device. When the electronic device is received within the body, the connector of the removable case may mate with the connector port in the electronic device.

The electronic device may include wireless circuitry with one or more antennas. An antenna in the electronic device may have resonating element structures such as inverted-F antenna resonating element structures, slot antenna resonating element structures, and other resonating elements. The antenna in the electronic device has the potential of becoming detuned due to the presence of material in the removable case.

To restore antenna performance in an electronic device that has been inserted into a removable case, the removable case may be provided with supplemental antenna structures. The supplemental antenna structures may overlap antenna resonating element(s) in the electronic device, thereby returning the antenna so that the antenna exhibits a desired frequency response.

If desired, the supplemental antenna structures may be provided with tunable circuitry. The tunable circuitry can be adjusted to restore antenna performance when the electronic device is mounted in the removable case or can otherwise be adjusted to tune antenna performance.

DETAILED DESCRIPTION

Figure 1:
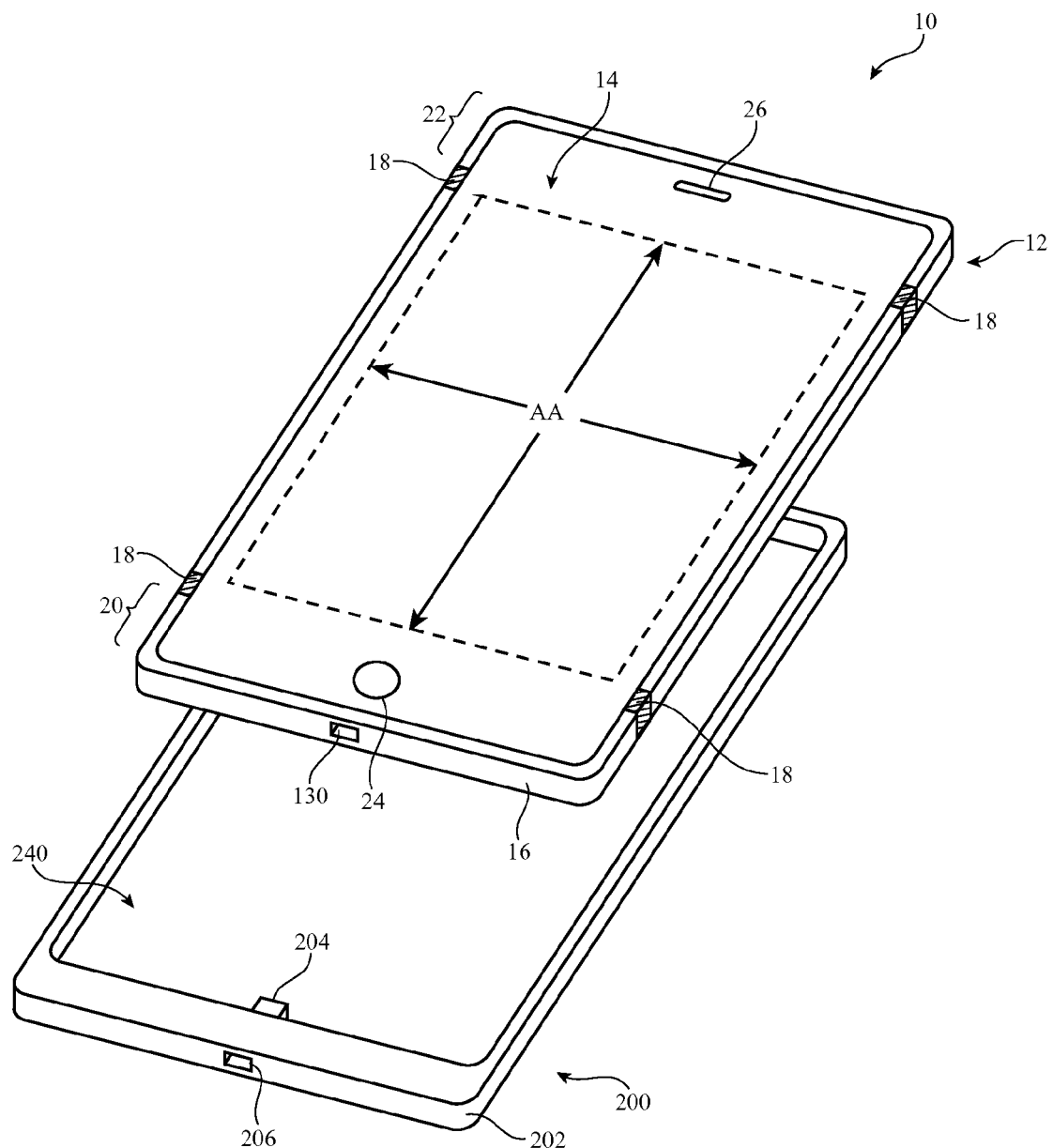
FIG. 1 is a perspective view of an illustrative electronic device and a mating removable case in accordance with an embodiment.

Electronic devices may be provided with removable external cases. The removable external cases may contain supplemental components such as a supplemental battery to extend battery life. An illustrative electronic device and a mating removable case are shown in the exploded perspective view of FIG. 1. As shown in FIG. 1, electronic device 10 may have a rectangular shape and case 200 may have a body such as body 202 with a corresponding rectangular recess. Rectangular recess 240 of body 202 may be configured to receive a rectangular device such as electronic device 10 of FIG. 1. Electronic devices and cases of other shapes may be used, if desired. For example, a case may have a folding cover, may have the shape of a sleeve that slides over an electronic device, may have a shape that attaches to only one end of an electronic device, or may have other suitable shapes. The example of FIG. 1 is merely illustrative.

Device 10 may include one or more antennas such as loop antennas, inverted-F antennas, planar inverted-F antennas, slot antennas, monopole antennas, hybrid antennas that include antenna structures of more than one type, or other suitable antennas. Conductive structures for the antennas may, if desired, be formed from conductive electronic device structures. The conductive electronic device structures may include conductive housing structures and internal structures (e.g., brackets, metal members that are formed using techniques such as stamping, machining, laser cutting, etc.), and other conductive electronic device structures. The housing structures may include peripheral structures such as peripheral conductive structures that run around the periphery of an electronic device. The peripheral conductive structure may serve as a bezel for a planar structure such as a display, may serve as sidewall structures for a device housing, may have portions that extend upwards from an integral planar rear housing (e.g., to form vertical planar sidewalls or curved sidewalls), and/or may form other housing structures. Gaps may be formed in the peripheral conductive structures that divide the peripheral conductive structures into peripheral segments. One or more of the segments may be used in forming one or more antennas for electronic device 10. Antennas may also be formed using an antenna ground plane formed from conductive housing structures such as metal housing midplate structures and other internal device structures. Rear housing wall structures may be used in forming antenna structures such as an antenna ground.

Electronic device 10 may be a portable electronic device or other suitable electronic device. For example, electronic device 10 may be a laptop computer, a tablet computer, a somewhat smaller device such as a wristwatch device, pendant device, headphone device, earpiece device, or other wearable or miniature device, a handheld device such as a cellular telephone, a media player, an electronic stylus, or other small portable device. Device 10 may also be a television, a set-top box, a desktop computer, a computer monitor into which a computer has been integrated, or other suitable electronic equipment.

Device 10 may include a housing such as housing 12. Housing 12 may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

The rear face of housing 12 may have a planar housing wall. The rear housing wall may be formed from metal with one or more regions that are filled with plastic or other dielectric. Portions of the rear housing wall that are separated by dielectric in this way may be coupled together using conductive structures (e.g., internal conductive structures) and/or may be electrically isolated from each other.

Device 10 may, if desired, have a display such as display 14. Display 14 may be mounted on the opposing front face of device 10 from the rear housing wall. Display 14 may be a touch screen that incorporates capacitive touch electrodes or may be insensitive to touch.

Display 14 may include image pixels formed from light-emitting diodes (LEDs), organic LEDs (OLEDs), plasma cells, electrowetting pixels, electrophoretic pixels, liquid crystal display (LCD) components, or other suitable image pixel structures. A display cover layer such as a layer of clear glass or plastic, a layer of sapphire, a transparent dielectric such as clear ceramic, fused silica, transparent crystalline material, or other materials or combinations of these materials may cover the surface of display 14. Buttons such as button 24 may pass through openings in the cover layer. The cover layer may also have other openings such as an opening for speaker port 26.

Housing 12 may include peripheral housing structures such as structures 16. Structures 16 may run around the periphery of device 10 and display 14. In configurations in which device 10 and display 14 have a rectangular shape with four edges, structures 16 may be implemented using peripheral housing structures that have a rectangular ring shape with four corresponding edges (as an example). Peripheral structures 16 or part of peripheral structures 16 may serve as a bezel for display 14 (e.g., a cosmetic trim that surrounds all four sides of display 14 and/or that helps hold display 14 to device 10). Peripheral structures 16 may also, if desired, form sidewall structures for device 10 (e.g., by forming a metal band with vertical sidewalls, by forming curved sidewalls that extend upwards as integral portions of a rear housing wall, etc.).

Peripheral housing structures 16 may be formed of a conductive material such as metal and may therefore sometimes be referred to as peripheral conductive housing structures, conductive housing structures, peripheral metal structures, or a peripheral conductive housing member (as examples). Peripheral housing structures 16 may be formed from a metal such as stainless steel, aluminum, or other suitable materials. One, two, or more than two separate structures may be used in forming peripheral housing structures 16.

It is not necessary for peripheral housing structures 16 to have a uniform cross-section. For example, the top portion of peripheral housing structures 16 may, if desired, have an inwardly protruding lip that helps hold display 14 in place. The bottom portion of peripheral housing structures 16 may also have an enlarged lip (e.g., in the plane of the rear surface of device 10). Peripheral housing structures 16 may have substantially straight vertical sidewalls, may have sidewalls that are curved, or may have other suitable shapes. In some configurations (e.g., when peripheral housing structures 16 serve as a bezel for display 14), peripheral housing structures 16 may run around the lip of housing 12 (i.e., peripheral housing structures 16 may cover only the edge of housing 12 that surrounds display 14 and not the rest of the sidewalls of housing 12).

If desired, housing 12 may have a conductive rear surface. For example, housing 12 may be formed from a metal such as stainless steel or aluminum. The rear surface of housing 12 may lie in a plane that is parallel to display 14. In configurations for device 10 in which the rear surface of housing 12 is formed from metal, it may be desirable to form parts of peripheral conductive housing structures 16 as integral portions of the housing structures forming the rear surface of housing 12. For example, a rear housing wall of device 10 may be formed from a planar metal structure and portions of peripheral housing structures 16 on the sides of housing 12 may be formed as vertically extending integral metal portions of the planar metal structure. Housing structures such as these may, if desired, be machined from a block of metal and/or may include multiple metal pieces that are assembled together to form housing 12. The planar rear wall of housing 12 may have one or more, two or more, or three or more portions.

Display 14 may include conductive structures such as an array of capacitive electrodes, conductive lines for addressing pixel elements, driver circuits, etc. Housing 12 may include internal structures such as metal frame members, a planar housing member (sometimes referred to as a midplate) that spans the walls of housing 12 (i.e., a substantially rectangular sheet formed from one or more parts that is welded or otherwise connected between opposing sides of member 16), printed circuit boards, and other internal conductive structures. These conductive structures, which may be used in forming a ground plane in device 10, may be located in the center of housing 12 under active area AA of display 14 (e.g., the portion of display 14 that contains a display module for displaying images).

In regions such as regions 22 and 20, openings may be formed within the conductive structures of device 10 (e.g., between peripheral conductive housing structures 16 and opposing conductive ground structures such as conductive housing midplate or rear housing wall structures, a printed circuit board, and conductive electrical components in display 14 and device 10). These openings, which may sometimes be referred to as gaps, may be filled with air and/or solid dielectrics such as plastic, glass, ceramic, polymers with fiber filler material (e.g., fiber composites), sapphire, etc.

Conductive housing structures and other conductive structures in device 10 such as a midplate, traces on a printed circuit board, display 14, and conductive electronic components may serve as a ground plane for the antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 20 and 22. If desired, the ground plane that is under active area AA of display 14 and/or other metal structures in device 10 may have portions that extend into parts of the ends of device 10 (e.g., the ground may extend towards the dielectric-filled openings in regions 20 and 22).

In general, device 10 may include any suitable number of antennas (e.g., one or more, two or more, three or more, four or more, etc.). The antennas in device 10 may be located at opposing first and second ends of an elongated device housing (e.g., at ends 20 and 22 of device 10 of FIG. 1), along one or more edges of a device housing, in the center of a device housing, in other suitable locations, or in one or more of these locations. The arrangement of FIG. 1 is merely illustrative.

Portions of peripheral housing structures 16 may be provided with gap structures. For example, peripheral housing structures 16 may be provided with one or more peripheral gaps such as gaps 18, as shown in FIG. 1. The gaps in peripheral housing structures 16 may be filled with dielectric such as polymer, ceramic, glass, air, other dielectric materials, or combinations of these materials. Gaps 18 may divide peripheral housing structures 16 into one or more peripheral conductive segments. There may be, for example, two peripheral conductive segments in peripheral housing structures 16 (e.g., in an arrangement with two gaps), three peripheral conductive segments (e.g., in an arrangement with three gaps), four peripheral conductive segments (e.g., in an arrangement with four gaps, etc.). The segments of peripheral conductive housing structures 16 that are formed in this way may form parts of antennas in device 10. If desired, gaps may extend across the width of the rear wall of housing 12 and may penetrate through the rear wall of housing 12 to divide the rear wall into different portions. Polymer or other dielectric may fill these housing gaps (grooves).

In a typical scenario, device 10 may have upper and lower antennas (as an example). An upper antenna may, for example, be formed at the upper end of device 10 in region 22. A lower antenna may, for example, be formed at the lower end of device 10 in region 20. The antennas may be used separately to cover identical communications bands, overlapping communications bands, or separate communications bands. The antennas may be used to implement an antenna diversity scheme or a multiple-input-multiple-output (MIMO) antenna scheme.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, etc.

Case 200 may have a body such as body 202. Body 202 may be formed from plastic and/or other materials. For example, body 202 of case 200 may be formed from injection molded plastic. Other insulating and/or conductive materials may be used in forming body structures such as body 202 if desired (e.g., ceramic, glass, organic materials, metal, fiber composite materials and other materials formed from fibers, etc.). Rectangular recess 240 may be shaped to receive electronic device 10. If desired, other shapes may be formed in body 202 to receive device 10. The configuration of FIG. 1 is illustrative.

A battery and other components may be mounted within body 202 of case 200. Device 10 may have a connector port with a connector such as female connector 130. Connector 130 may have signal pins and power pins (sometimes referred to as contacts, signal paths, or signal lines). For example, connector 130 may have 5-20 contacts, 16 contacts, 8 contacts, more than 3 contacts, or fewer than 32 contacts. In some embodiments, connector 130 may be a standardized connector such as USB-A, USB-A Mini or Micro, USB-C, the Lightning connector by Apple Inc., or any other standardized or proprietary connector. Case 200 may have a mating connector such as male connector 204. When device 10 is mounted in case 200, connector 204 and connector 130 may be coupled to each other (i.e., the contacts of connector 204 may mate with corresponding contacts in connector 130). The battery in case 200 may supply supplemental power to device 10 by routing power signals to the circuitry of device 10 through power pins in connectors 204 and 130.

Connector 204 may be coupled to female connector 206. When it is desired to use an accessory or other external equipment with device 10, an external plug (e.g., a plug on the end of an accessory cable or a plug in a dock) may be inserted into connector 206. Internal wiring in case 200 may route signals from contacts in plug in connector 206 to corresponding contacts in connector 204. Because connector 204 is coupled to connector 130, this routes the signals from the accessory or other external equipment to device 10 (i.e., plugs 204 and 206 serve as a port replicator).

Figure 2:
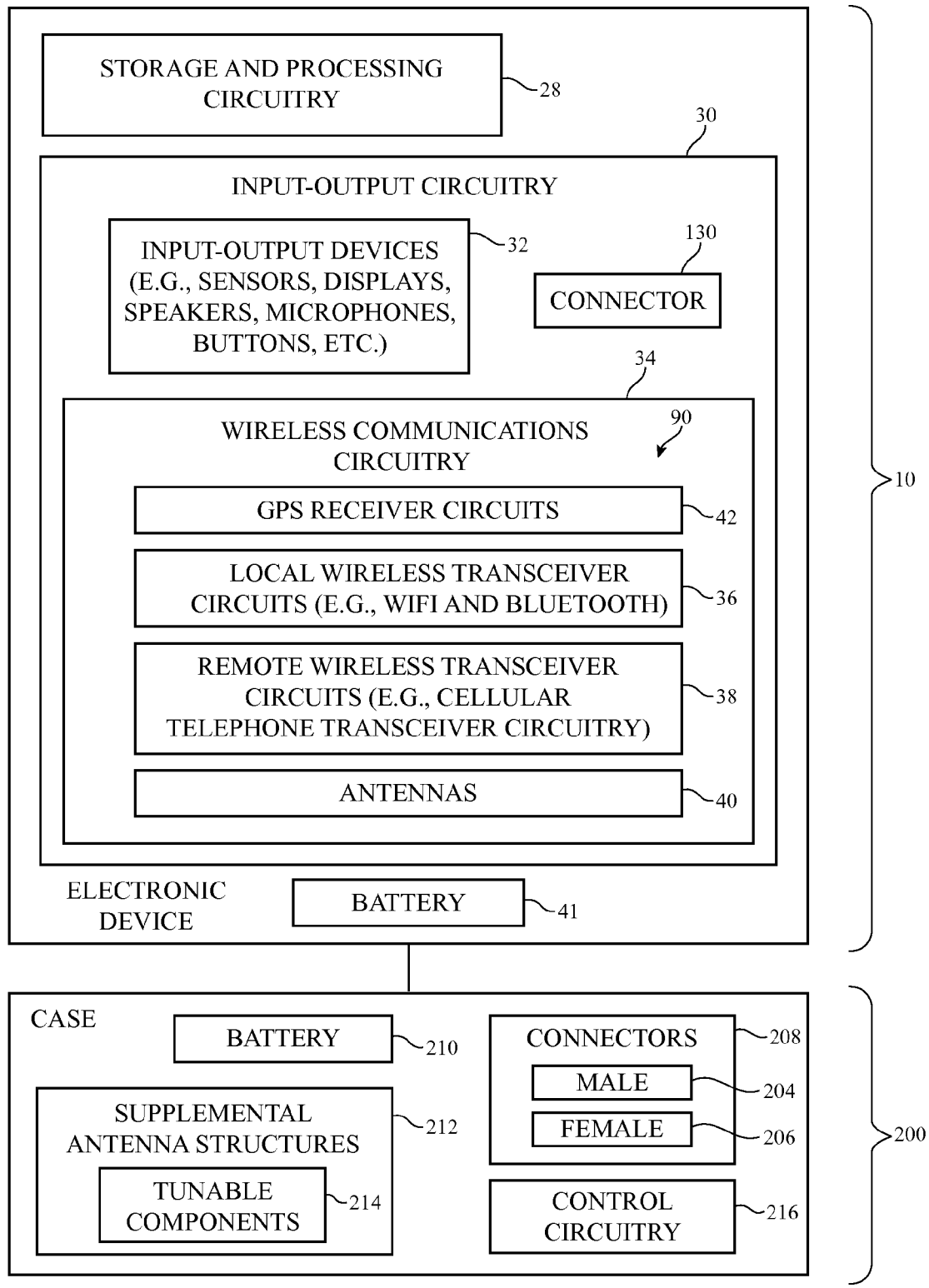
FIG. 2 is a schematic diagram of illustrative circuitry in an electronic device and an associated case in accordance with an embodiment.

A schematic diagram showing illustrative components that may be used in device 10 and case 200 of FIG. 1 is shown in FIG. 2. As shown in FIG. 2, device 10 may be powered by an internal power source such as battery 41. External power may also be supplied to device 10 through connector 130. For example, power may be received from battery 210 in case 200 when device 10 has been mounted in case 200 so that connector 204 mates with connector 130.

Device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc.

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, fingerprint sensors (e.g., a fingerprint sensor integrated with a button such as button 24 of FIG. 1), etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, and 42. Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 38 may handle voice data and non-voice data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, near field communications (NFC) circuitry, etc. Wireless communications circuitry 34 may include global positioning system (GPS) receiver equipment such as GPS receiver circuitry 42 for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include one or more antennas such as antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna.

Case 200 may have control circuitry 216 (e.g., storage and processing circuitry such as circuitry 28 of device 10). Control circuitry 216 may have communications circuitry that communicates with corresponding communications circuitry in device 10, thereby allowing control circuitry 216 and control circuitry 28 to communicate to exchange information (e.g., to transmit and receive commands, etc.).

Case 200 may also include supplemental antenna structures 212. Structures 212 may include parasitic antenna resonating elements and/or antennas and other conductive structures for adjusting antenna 40 and the wireless performance of device 10. Structures 212 may include conductive structures and circuit components that modify the performance of antennas 40 in device 10 (e.g., to retune an antenna that would otherwise be detuned due to the presence of case 200. Antenna structures 212 may include antenna structures that are coupled to antennas 40 via a hardwired path (e.g., a ground signal path or other path that passes through connectors 204 and 130) and/or that are coupled to antennas 40 via near-field coupling (e.g., capacitive or inductive coupling between antennas 40 and antenna structures 212).

If desired, supplemental antenna structures 212 may include tunable circuitry such as one or more tunable (adjustable) components 214. Tunable components 214 may be controlled by control signals from device 10 and/or case 200. For example, control circuitry 216 may adjust tunable components 214 based on information received from control circuitry 28. Control circuitry 28 may, as an example, determine that antenna 40 should be retuned due to the presence of case 200 or should be tuned because other criteria have been satisfied. Based on this determination, control circuitry 28 may send commands to case 200 that direct control circuitry 216 to adjust tunable components 214 accordingly.

Tunable components 214 may contain switches, tunable inductors, tunable capacitors, or other circuitry that exhibits adjustable electrical properties. Tunable components 214 may be used to adjust the performance of antenna structures 212 and/or antennas 40. Tunable and/or fixed antenna structures in case 200 such as supplemental antenna structures 212 may be used to help ensure that device 10 operates properly, even in the presence of the structures of case 200 such as dielectric and/or conductive structures that might otherwise adversely affect antenna performance.

Connectors 208 in case 200 may include male connector 204 and female connector 206. Male connector 204 may be coupled with female connector 130 in device 10 when device 10 is mounted within case 200. Female connector 206 may be configured to receive a plug from external equipment.

Figure 3:
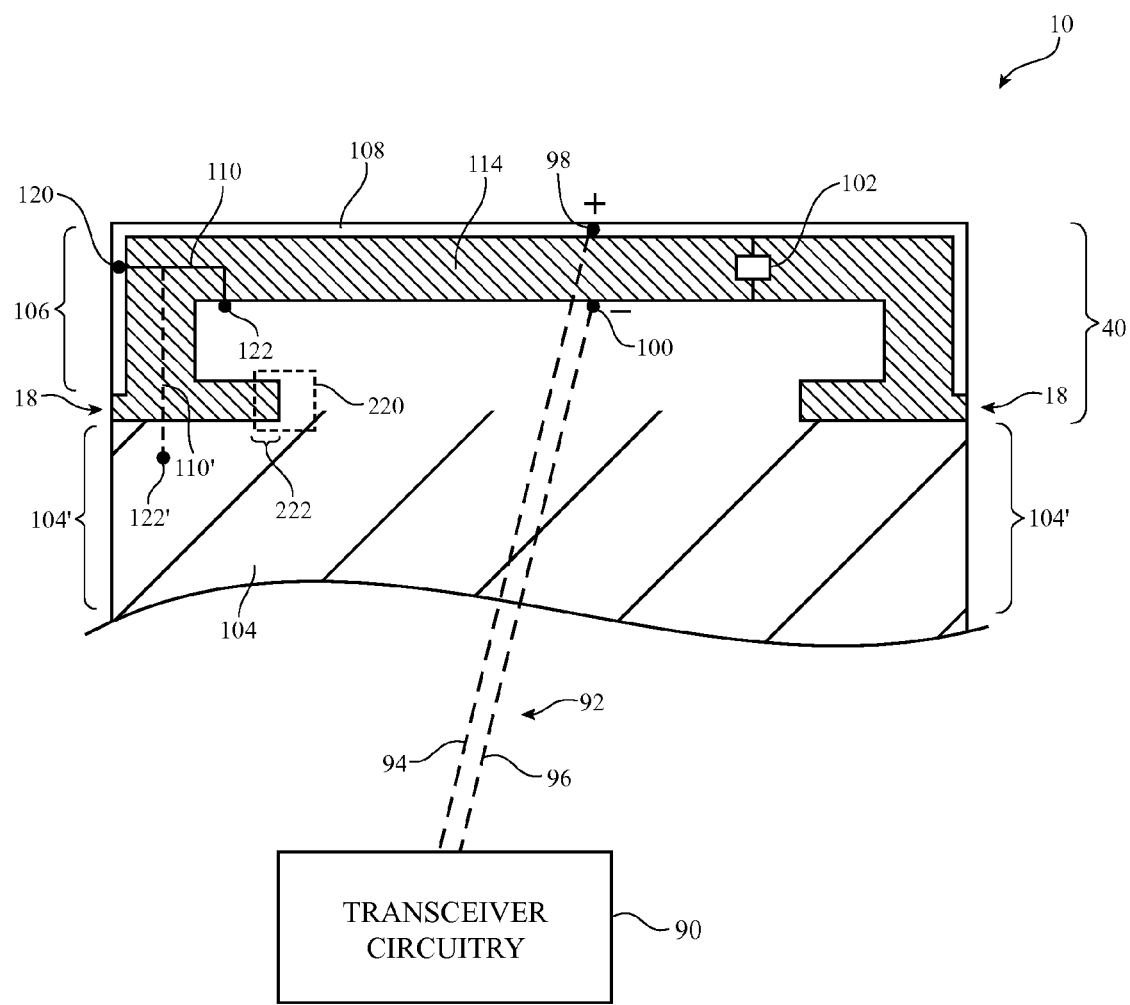
FIG. 3 is a interior view of a portion of an electronic device having an antenna and an overlapping supplemental antenna structure in a case in accordance with an embodiment.

An interior view of a portion of device 10 showing an illustrative antenna of the type that may be formed in device 10 is shown in FIG. 3. Antenna 40 of FIG. 3 may be formed at end 20, end 22, or other portion of device 10. The configuration for antenna 40 of FIG. 3 is based on an inverted-F antenna design with a slot resonating element (i.e., antenna 40 of FIG. 3 is a hybrid inverted-F slot antenna). This is merely illustrative. Antenna 40 may be any suitable type of antenna. For example, the slot portion of antenna 40 of FIG. 3 may be omitted to form an inverted-F antenna or the inverted-F portion of antenna 40 of FIG. 3 may be omitted to form a slot antenna, etc.

As shown in FIG. 3, antenna 40 may be coupled to transceiver circuitry 90, so that transceiver circuitry 90 may transmit antenna signals through antenna 40 and may receive antenna signals through antenna 40.

Transceiver circuitry 90 may be coupled to antenna 40 using paths such as transmission line path 92. Transmission line 92 may include positive signal line (path) 94 and ground signal line (path) 96. Transmission line 92 may be coupled to an antenna feed for antenna 40 that is formed from positive antenna feed terminal 98 and ground antenna feed terminal 100. Positive signal line 94 may be coupled to positive antenna feed terminal 98 and ground signal line 96 may be coupled to ground antenna feed terminal 100. If desired, impedance matching circuitry, switching circuitry, filter circuitry, and other circuits may be interposed in the path between transceiver circuitry 90 and antenna 40. Configurations for antenna 40 that include multiple feeds may also be used.

Antenna 40 of FIG. 3 includes inverted-F antenna resonating element 106 and antenna ground 104. Ground 104 may be formed from metal portions of housing 12 (e.g., portions of the rear wall of housing 12, a housing midplate, etc.), conductive structures such as display components and other electrical components, ground traces in printed circuits, etc. For example, ground 104 may include portions such as portions 104' that are formed from metal housing walls, a metal band or bezel, or other peripheral conductive housing structures.

Antenna resonating element 106 may be formed from conductive structure 108. Structure 108 may be formed from peripheral conductive housing structure in device 10 (e.g., a segment of structures 16 of FIG. 1) or other conductive structure. Structure 108 may form a main resonating element arm for inverted-F antenna resonating element 106 and may have left and right ends that are separate from ground structure 104' by peripheral gaps 18.

Conductive structure (resonating element arm) 108 may have long and short branches (located on opposing sides of the antenna feed in the orientation of FIG. 3) that support respective lower and higher frequency antenna resonances (e.g., low band and mid-band resonances). Inverted-F antennas that have opposing branches such as these may sometimes be referred to as T antennas or multi-branch inverted-F antennas.

Dielectric 114 may form a gap that separates structure 108 from ground 104. The shape of the dielectric gap associated with dielectric 114 may form a slot antenna resonating element (i.e., the conductive structures surrounding dielectric 114 may form a slot antenna). The slot antenna resonating element may support an antenna resonance at higher frequencies (e.g., a midband and/or a high band resonance). Higher frequency antenna performance may also be supported by harmonics of the lower-frequency resonances associated with the longer and shorter branches of structure 108.

One or more electrical components such as component 102 may span dielectric gap 114. Components 102 may include tunable and fixed components such as resistors, capacitors, inductors, switches and other structures to provide tuning capabilities, etc. Components 102 may be used to tune the performance of antenna 40 dynamically during antenna operation or may include only fixed components.

Antenna 40 may have a return path (sometimes referred to as a short circuit path or short pin) such as return path 110. Return path 110 may be coupled between the main inverted-F resonating element arm formed from structure 108 and antenna ground 104 in parallel with the antenna feed formed by feed terminals 98 and 100. Return path 110 may be formed from a metal member having opposing first and second ends. In the example of FIG. 3, return path 110 is formed from a metal structure that has a first end with a terminal 120 coupled to structure 108 of inverted-F antenna resonating element 106 (e.g., on a housing sidewall or other peripheral conductive structure) and has a second end with a terminal 122 coupled to antenna ground 104. Return path 110 may have other shapes and sizes, as illustrated, for example, by dashed line 110' and illustrative terminal 122'.

The presence of case 200 may affect the operation of the structures associated with antenna 40. For example, case 200 may include plastic and other dielectric materials that serve to load antenna 40 when device 10 is installed within case 200 and/or metal in case 200 may affect the resonances associated with antenna 40. When antenna 40 is affected in this way, there is a potential for antenna 40 to become detuned. When detuned, the antenna resonances of antenna 40 become shifted to lower and/or higher frequencies, degrading antenna performance.

Case 200 may use supplemental antenna structures 212 to compensate for potential reductions in antenna performance due to antenna detuning. For example, an antenna resonance associated with slot antenna resonating element 114 may shift downwards in frequency when antenna 40 is loaded with dielectric in case 200. To compensate for this undesired detuning of antenna 40, a conductive structure such as metal patch 220 or other supplement antenna structure 212 may be incorporated into case 200. The location of metal patch 220 may be selected so that metal patch 220 adjusts the frequency response of antenna 40 when device 10 is installed within case 200. As shown in FIG. 3, for example, when case 200 is use to cover device 10, metal patch 220 may overlap a part of slot antenna resonating element 114, thereby truncating end portion 222 of slot 114. The presence of metal patch 220 shortens slot 114 so that the frequency response of antenna 40 will be shifted upwards in frequency by an amount that is sufficient to counteract the downwards shift in frequency produced by the dielectric loading of case 200. Antenna 40 will therefore be able to exhibit the same frequency response regardless of whether or not device 10 is installed within case 200.

Figure 4:
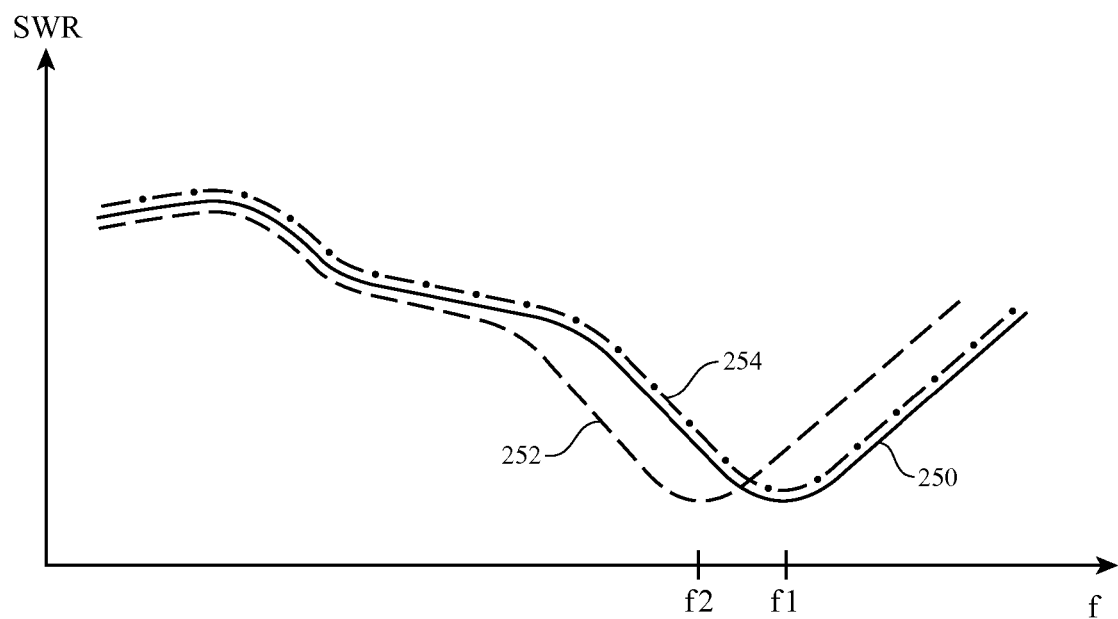
FIG. 4 is a graph showing how desired antenna performance may be achieved by incorporating supplemental antenna structures into a case in accordance with an embodiment.

FIG. 4 is a graph in which antenna performance (standing wave ratio SWR) has been plotted as a function of operating frequency for various operating conditions. The frequency range of FIG. 4 may cover midband and high band cellular telephone frequencies or other suitable frequency ranges. When antenna 40 (e.g., antenna 40 of FIG. 3 or other suitable antenna) is operated in free space and device 10 is not covered by case 200, antenna 40 may exhibit a frequency response of the type shown by curve 250. Curve 250 shows how antenna 40 exhibits a resonance at desired operating frequency f1. When antenna 40 is installed in a case without a compensating supplemental antenna structure, dielectric loading from the cases may detune the antenna. In particular, antenna 40 may exhibit a frequency response of the type given by curve 252. In this situation, the peak response of antenna 40 has shifted to an undesirably low frequency f2 (i.e., antenna 40 has been detuned by the case). When antenna 40 is installed in case 200, supplemental antenna structures 214 such as metal patch 220 of FIG. 3 or other metal structures overlap slot 114, so the length of slot 114 will be shortened and the frequency response of antenna 40 will be shifted upwards to a response of the type shown by curve 254. As this example demonstrates, incorporation of a metal patch in case 200 that overlaps the end of a slot resonating element in antenna 40 when device 10 is installed in case 200 can help ensure that antenna 40 operates satisfactorily, whether or not device 10 is installed in case 200.

Figure 5:
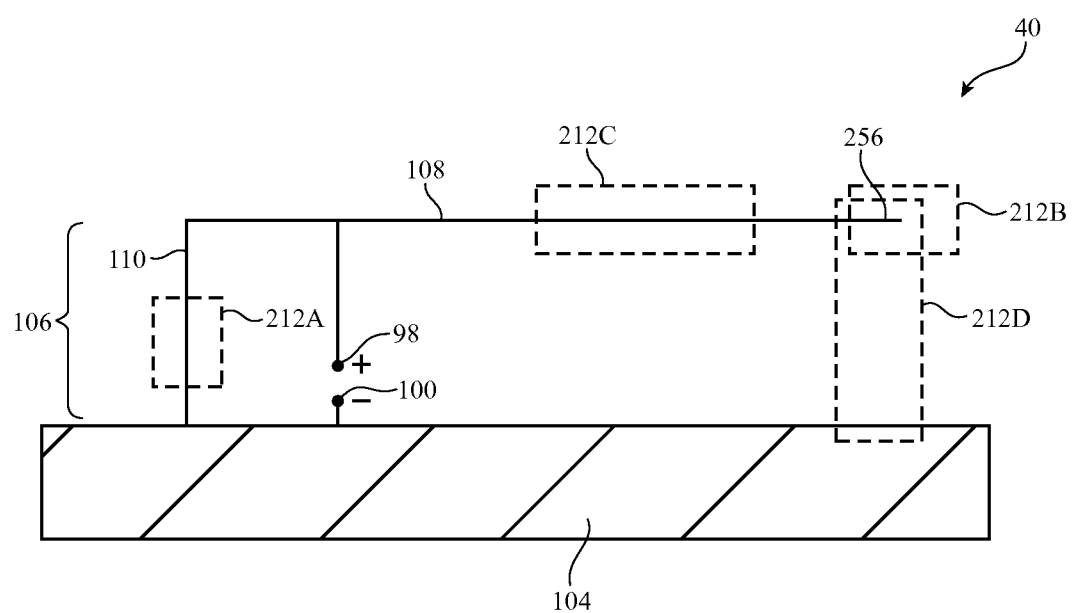
FIG. 5 is a diagram showing how conductive structures such as metal patches or other supplemental antenna structures in a case may overlap portions of an antenna in an electronic device to tune the antenna in accordance with an embodiment.

In the illustrative example of FIG. 3, metal patch 222 overlaps one of the ends of slot antenna resonating element 114. If desired, other types of antenna structures may be tuned by structures in case 200. Consider, as an example, the illustrative inverted-F antenna of FIG. 5. As shown in FIG. 5, antenna 40 includes inverted-F antenna resonating element 106 and antenna ground 104. Antenna resonating element 106 may include antenna resonating element arm 108 (e.g., an arm with one or more branches), return path 110, and an antenna feed formed from positive antenna feed terminal 98 and ground antenna feed terminal 100. Case 200 may include one or more supplemental antenna structures such as supplemental antenna structures 212A, 212B, 212C, and 212D. Structure 212A may be placed over return path 110 when case 200 is used to cover device 10 and may result in an upwardfrequency tuning of the antenna resonance associated with antenna 40. Structure 212B may overlap end 256 of antenna resonating element 108 and may shift the frequency response of antenna 40 to a lower frequency. Structure 212C may be overlap arm 108 between end 256 and return path 110 and may also be used to shift the frequency response of antenna 40 to a lower frequency. Illustrative structure 212D may have portions that overlap both end portion 256 of arm 108 and an opposing portion of ground 104 and may help shift the frequency response of antenna 40 to a lower frequency. Other types of supplemental antenna structures may be used to tune antenna 40 of FIG. 5 when device 10 is installed within case 200 if desired. The configurations of FIG. 5 are merely illustrative.

Figure 6:
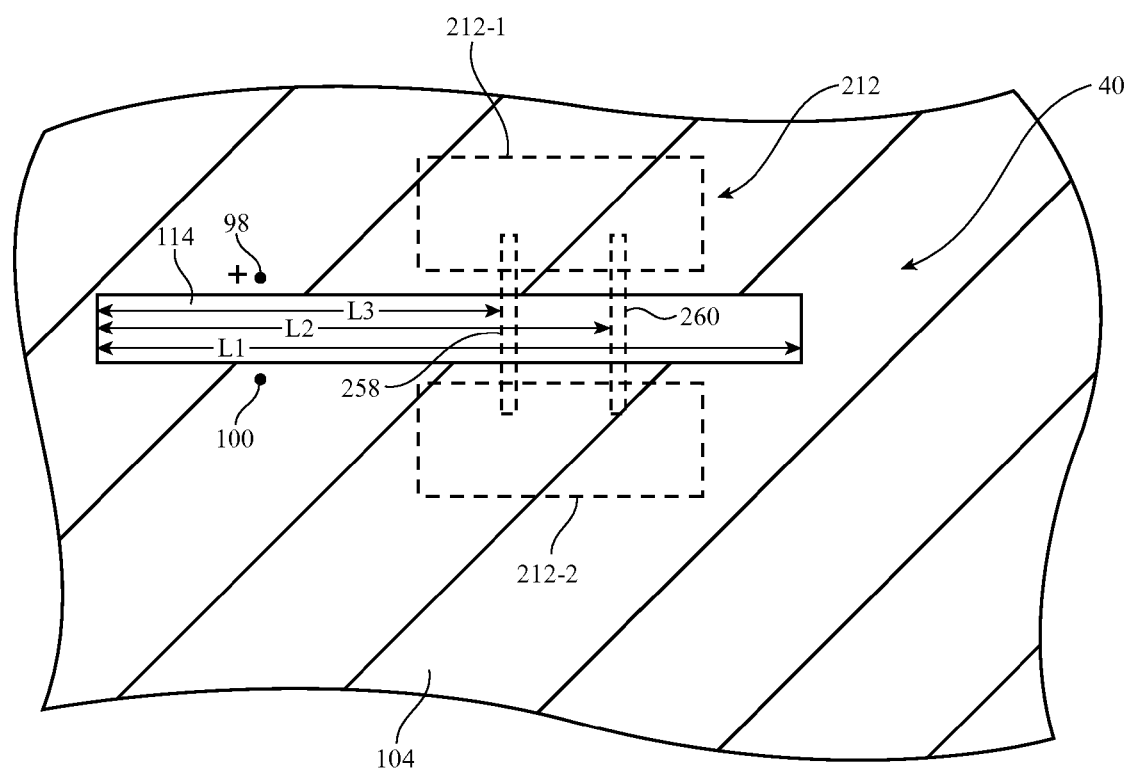
FIG. 6 is diagram showing how supplemental antenna structures in a case that include tunable circuitry may be capacitively coupled to an antenna in a device in accordance with an embodiment.

In the illustrative example of FIG. 6, antenna 40 has been formed from slot 114 in ground plane 104. Slot 114 may form the only resonating element in antenna 40 or antenna 40 may include additional resonating element structures. Antenna 40 may be fed using antenna feed terminals such as positive antenna feed terminal 98 and ground antenna feed terminal 100. Supplemental antenna structures 212 of FIG. 6 include first metal patch 212-1, second metal patch 212-2, and adjustable components such as switches 258 and 260 (or adjustable inductors, etc.). There may be fewer switches (or other adjustable components 214) in antenna structures 212 or more switches in antenna structures 212. The configuration of FIG. 6 is merely illustrative.

Metal patch 212-1 may be capacitively coupled to the portions of ground 104 that are overlapped by metal patch 212-1. Metal patch 212-2 may likewise be capacitively coupled to ground 104 on an opposing side of slot 114. Tunable components 214 such as components 258 and 260 (e.g., switches or other adjustable electrical components) may be controlled by control circuitry 216 (which may, in turn, be controlled by information received from control circuitry 28 in device 10 over connectors 130 and 204). When device 10 is mounted in case 200, antenna 40 may become detuned due to the presence of dielectric in case 200 that loads antenna 40 or due to the presence of other structures in case 200 (e.g., metal structures, etc.). Structures 212 are capacitively coupled to opposing sides of slot 114 and are therefore shorted to ground 104 at these locations when operating at radio frequencies, so switches 258 and 260 bridge slot 114. By adjusting switches 258 and 260 (or other components 214 that bridge slot 114), the length of slot 114 can be dynamically controlled. For example, when it is desired to configure slot 114 to exhibit a length of L1, switches 258 and 260 may be opened. When it is desired to reduce the length of slot 114 to L2, switch 258 may be placed in an open state while switch 260 may be closed. The length of slot 114 may be further shortened to length L3 by closing switch 258.

As this example demonstrates, the use of tunable components in supplemental antenna structures 212 of case 200 allows antenna 40 to be tuned during operation (e.g., to compensate for detuning experienced as a result of dielectric loading by case 200 or other types of antenna detuning or to otherwise ensure that antenna 40 is covering desired frequencies). Tunable arrangements of the type shown in FIG. 6 may be used in tuning an inverted-F antenna, a loop antenna, a patch antenna, a slot antenna, a planar inverted-F antenna, a hybrid antenna that includes resonating elements of more than one type, or any other suitable antenna 40. The configuration of FIG. 6 in which supplemental antenna structures 212 and switches 258 and 260 overlap a slot antenna resonating element is merely illustrative. If desired, components 258 and 260 may be tunable inductors, tunable capacitors, circuits that include one or more tunable inductors, capacitors, switches, or other adjustable circuitry, or any other tunable circuits for adjusting antenna performance for antenna 40.

Figure 7:
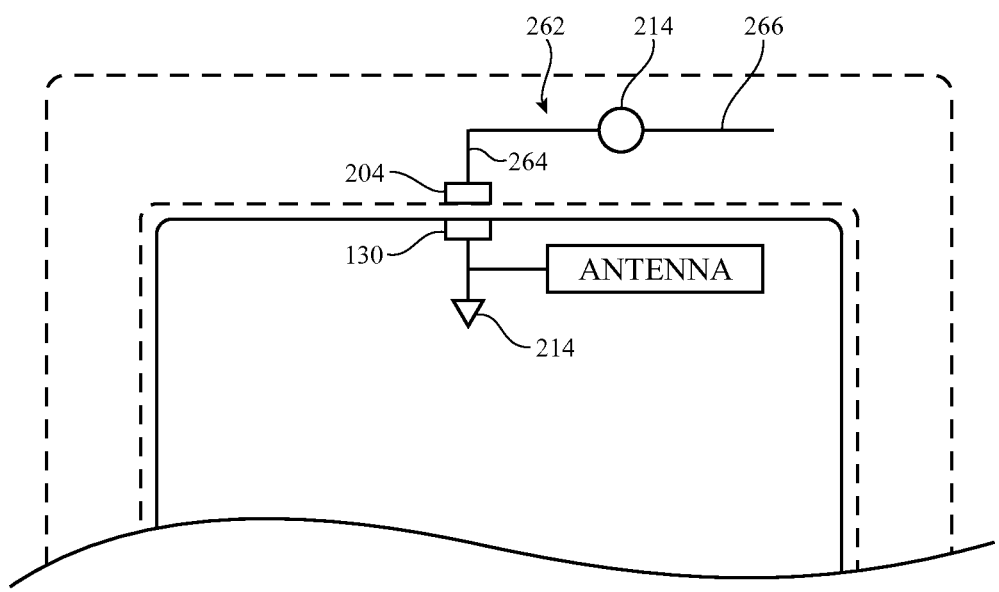
FIG. 7 is a diagram showing how a removable case may have a tunable antenna element such as a monopole element that is near-field coupled to an antenna in a device in accordance with an embodiment.

Another illustrative configuration for supplemental antenna structures 212 of case 200 is shown in FIG. 7. In the example of FIG. 7, device 10 includes antenna 40 (e.g., an inverted-F-slot antenna or other antenna). Connectors 204 and 130 mate with each other when device 10 is inserted within case 200. The presence of case 200 has the potential to detune antenna 40 due to dielectric loading. To compensate for this detuning, case 200 may be provided with supplemental antenna structures 212 such as tunable monopole element 262. Element 262 may have an end such as end 264 that is grounded to ground 104 of antenna 40 through a conductive path in connectors 130 and 204. Element 262 may also have an opposing end such as end 266. Element 262 may be a monopole antenna resonating element that is formed by metal traces on a printed circuit, plastic carrier, or other substrate, a strip of metal foil, wire, or other conductive structures that extend between end 264 and end 266. Element 262 may be a parasitic antenna resonating element that is near-field coupled to antenna 40. If desired, one or more tunable components such as tunable component 214 (e.g., a switch, a tunable inductor, etc.) may be interposed within element 262. Component 214 may be controlled by control signals from circuitry 216 and/or circuitry 28, so that antenna 40 can be retuned to compensate for detuning from case 200 or so that antenna 40 can be otherwise adjusted.

The foregoing is merely illustrative and various modifications can be made by those skilled in the art without departing from the scope and spirit of the described embodiments. The foregoing embodiments may be implemented individually or in any combination.

What is claimed is:

1. A removable electronic device case that is configured to mate with an electronic device, wherein the electronic device comprises a connector port and comprises an antenna with an antenna resonance at a desired operating frequency, the removable electronic device case comprising:
   a body that is configured to receive the electronic device and that shifts the antenna resonance away from the desired operating frequency;
   a connector that mates with the connector port;

control circuitry that is configured to receive control signals from the electronic device through the connector; and supplemental antenna structures that are configured to retune the antenna by shifting the antenna resonance back to the desired frequency.

2. The removable electronic device case defined in claim 1 wherein the antenna of the electronic device includes a slot resonating element and wherein the supplemental antenna structures include a metal structure that is configured to overlap the slot when the body receives the electronic device.

3. The removable electronic device case defined in claim 2 wherein the slot antenna resonating element has an end and a length and wherein the metal structure comprises a patch that is configured to overlap the end and shortens the length when the body receives the electronic device.

4. The removable electronic device case defined in claim 1 wherein the supplemental antenna structures include a tunable component that is actively adjusted by the control circuitry to tune the antenna based on the control signals received by the control circuitry from the electronic device through the connector.

5. The removable electronic device case defined in claim 4 wherein the tunable component comprises at least one switch.

6. The removable electronic device case defined in claim 5 wherein the antenna includes a slot antenna resonating element and the switch is configured to bridge the slot antenna resonating element when the body receives the electronic device.

7. The removable electronic device case defined in claim 4 wherein the supplemental antenna structures comprise a monopole parasitic antenna resonating element.

8. The removable electronic device case defined in claim 7 wherein the tunable component is interposed within the monopole parasitic antenna resonating element.

9. The removable electronic device case defined in claim 1 wherein the antenna comprises an inverted-F antenna and the supplemental antenna structures comprise a metal patch that is configured to overlap part of the inverted-F antenna when the body receives the electronic device.

10. The removable electronic device case defined in claim 9 wherein the inverted-F antenna has a resonating element arm with a first end coupled to a ground and a second end and the metal patch is configured to overlap the second end when the body receives the electronic device.

11. The removable electronic device case defined in claim 9 wherein the inverted-F antenna has a resonating element arm and a return path coupled between the resonating element arm and a ground, and the metal patch is configured to overlap the return path when the body receives the electronic device.

12. The removable electronic device case defined in claim 9 wherein the inverted-F antenna has a resonating element arm and the metal patch has a portion that is configured to overlap the resonating element arm and a portion that is configured to overlap an antenna ground when the body receives the electronic device.

13. The removable electronic device case defined in claim 1, wherein the electronic device comprises a first battery and the removable electronic device case further comprises:

a second battery that is configured to charge the first battery by conveying power to the electronic device through the connector while the electronic device mates with the electronic device case.

14. A removable electronic device case that is configured to mate with an electronic device that has an antenna and a connector port, comprising:

a body that is configured to receive the electronic device;

a connector that is configured to mate with the connector port; and supplemental antenna structures that include a tunable component that is adjusted based on signals received through the connector to tune a resonance of the antenna when the body receives the electronic device.

15. The removable electronic device case defined in claim 14 wherein the tunable component comprises a switch.

16. The removable electronic device case defined in claim 15 wherein the antenna includes a slot antenna resonating element and the switch is configured to bridge the slot antenna resonating element when the body receives the electronic device.

17. The removable electronic device case defined in claim 15 wherein the electronic device includes storage and processing circuitry, the removable electronic device case further comprising:

a battery that is configured to supply power to the electronic device through the connector when the body receives the electronic device; and control circuitry that is configured to communicate with the storage and processing circuitry through the connector and to adjust the tunable component when the body receives the electronic device.

18. The removable electronic device case defined in claim 14, wherein the connector port comprises a female connector port and the connector comprises a male connector that mates with the female connector port while the electronic device is received by the removable electronic device case, the male connector and the female connector port each comprise at least four contacts, and the at least four contacts comprise at least one signal pin that conveys control signals and at least one power pin that conveys power.

19. A removable electronic device case that is configured to mate with an electronic device that includes a connector port and that has a slot antenna resonating element with an end, the removable electronic device case comprising:

a body that is configured to receive the electronic device;

a metal patch that is configured to overlap the end of the slot antenna resonating element and shorten a perimeter of the slot antenna resonating element to tune a resonance of the slot antenna resonating element to a desired frequency when the body receives the electronic device; and a connector that is configured to mate with the connector port.

20. The removable electronic device case defined in claim 19 further comprising:

a battery that is configured to supply power to the electronic device through the connector when the body receives the electronic device, wherein the body comprises dielectric that lowers a resonant frequency for the slot antenna resonating element below a desired resonant frequency of operation, and the metal patch is located at a position within the body that overlaps the end of the slot antenna resonating element sufficiently to raise the lowered resonant frequency to the desired resonant frequency of operation when the body receives the electronic device.

21. The removable electronic device case defined in claim 19, wherein the metal patch is configured to shorten the perimeter of the slot antenna resonating element when radio-frequency signals are conveyed through the slot antenna resonating element and the metal patch is configured to not be in direct contact with the slot antenna resonating element when the removable electronic device case mates with the electronic device.

* * * * *